United States Patent

Laverone

[15] 3,695,649

[45] Oct. 3, 1972

[54] DEVICE FOR ASSEMBLING TUBULAR MEMBERS

[72] Inventor: Rene Georges Lavergne, 19 Avenue Henri Barbusse, Champrosay, Essonne, France

[22] Filed: June 5, 1970

[21] Appl. No.: 43,804

[30] Foreign Application Priority Data

June 19, 1969 France.....................6920569
April 29, 1970 France.....................7015684

[52] U.S. Cl..............................287/54 A, 287/126
[51] Int. Cl...............................................F16b 2/14
[58] Field of Search.........287/126, 54 A, 54 C, 54 E, 287/23, 56; 16/30

[56] References Cited

UNITED STATES PATENTS

| | | | |
|---|---|---|---|
| 2,129,432 | 9/1938 | Lipp | 287/54 A |
| 2,704,682 | 3/1955 | Davis | 287/126 |
| 2,179,912 | 11/1939 | Woodruff | 16/30 X |
| 1,953,636 | 4/1934 | Skelton | 16/30 |
| 3,545,796 | 12/1970 | Nicholls | 287/54 A |

Primary Examiner—David J. Williamowsky
Assistant Examiner—Wayne L. Shedd
Attorney—Ernest G. Montague

[57] ABSTRACT

An assembling device for securing a tubular member to any other member, comprising a pair of wedging members adapted to be engaged into said tubular member and having externally the same shape as the inner section of said tubular member. Said wedging members consist of a pair of complementary half-shells forming between them a cavity of which the internal wall is inclined. An expansion core is disposed into said cavity and of its external wall have the same inclination as the internal wall of said cavity. A control screw is engaged in an axial hole formed into said core, and said screw is adapted to caUse an axial movement of said expansion core in said cavity for obtaining the expansion of said complementary half-shells.

4 Claims, 12 Drawing Figures

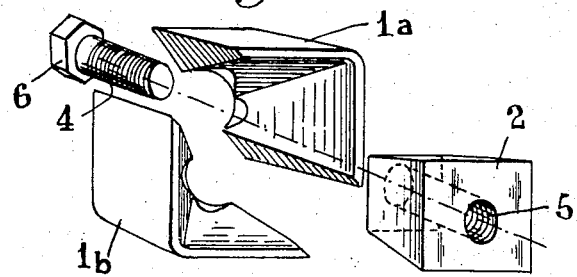
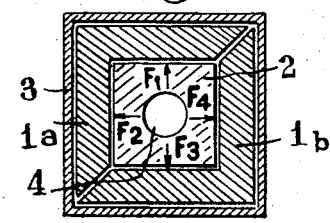
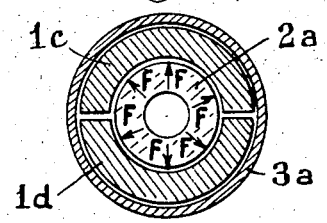
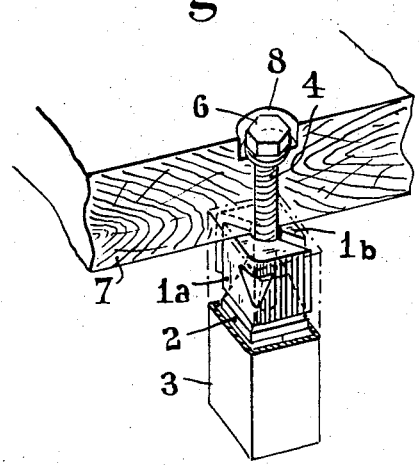
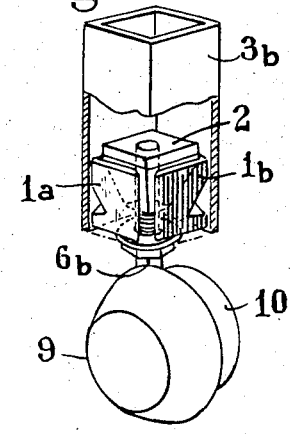

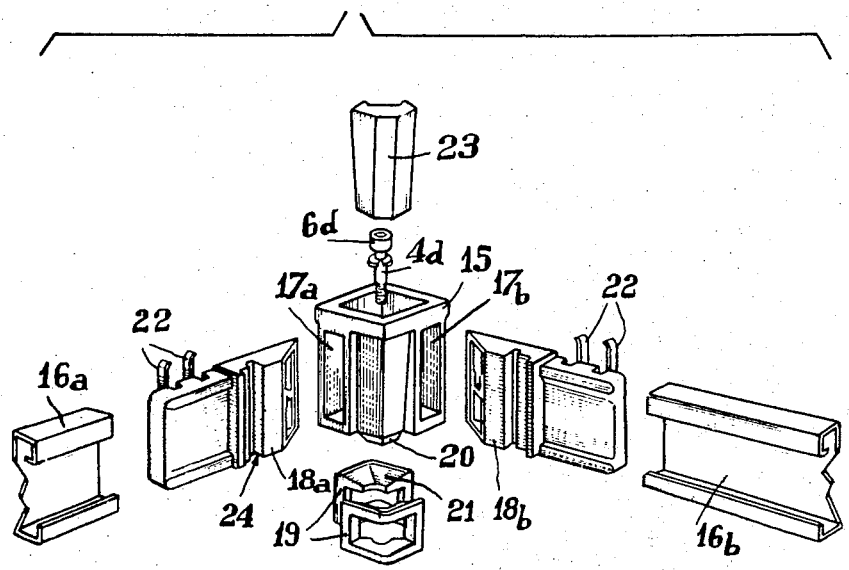
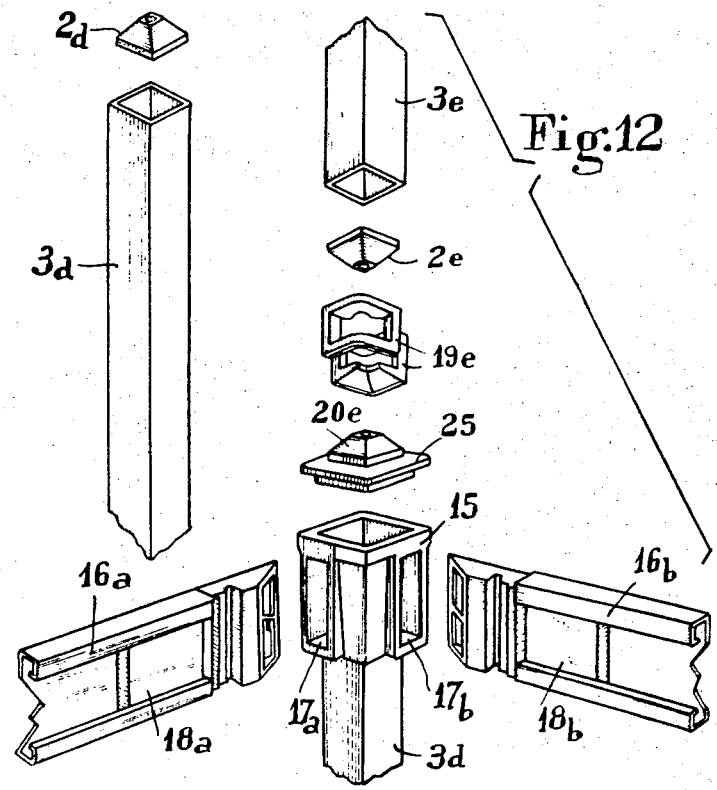

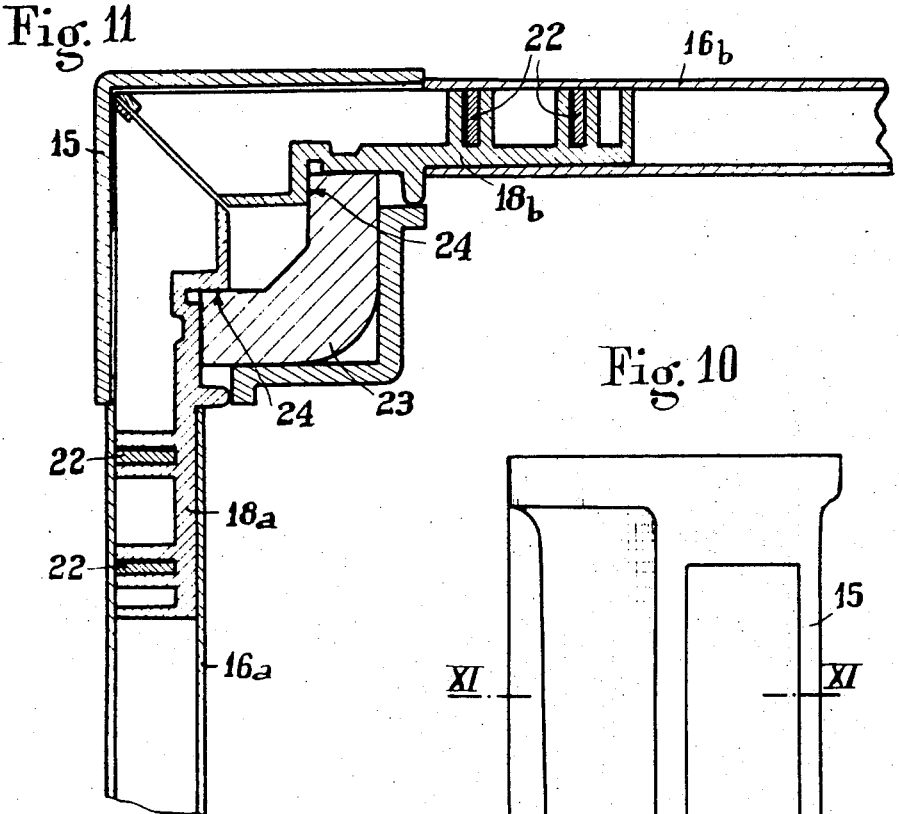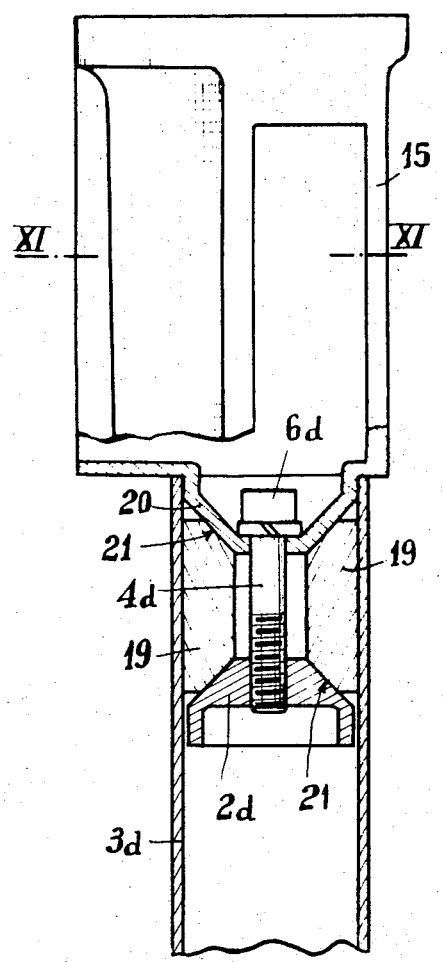

DEVICE FOR ASSEMBLING TUBULAR MEMBERS

This invention relates to assembling devices of the type designed for securing a tubular member to any other element, the latter consisting for example of another tubular member.

More particularly, this invention relates to assembling devices of this character wherein wedging members are provided which are adapted to be engaged into the tubular member to be secured in position and which are actuated by a control screw. By using devices of this type it is possible to avoid the drilling of one or several holes through the member to be secured, as well as the provision of fastening inserts on this member. Moreover, these assembling devices are also advantageous in that they are concealed completely within the members to be secured thereby.

However, hitherto known devices of this type are not entirely satisfactory. This is due mainly to the fact that the tightening of the wedging members is performed under awkward conditions.

Thus, in some of the known devices two wedging members are provided which are disposed tandemwise in the longitudinal direction and engage each other through cam faces or inclined ramps disposed in coplonar relationship. Thus, these two members are assembled by means of a control screw so that when the latter is screwed in a nut carried by one of said members these are moved towards each other and therefore wedged within the corresponding tubular member, due to the sliding engagement of these two members on each other along their contact cam faces.

However, as will be readily understood, this arrangement is not fully reliable. In fact, the two wedging members are only pressed against two diametrally opposite portions of the inner wall of the tubular member. On the other hand, the two friction areas provided between these members and the inner wall of the tubular member are shifted longitudinally so that the resulting wedging action is not balanced.

Other assembling devices now in common use comprise one or two wedging members so arranged that their expansion is adapted to be caused by the displacement of an inner core.

To this end, these wedging members are formed with a series of slots or notches forming as many clamping lugs adapted to engage the inner wall of the corresponding tubular member. But in this case the friction exerted by the wedging member is applied to a relatively small surface area. On the other hand the wedging members thus obtained have a reduced strength thus limiting considerably their field of application. On the other hand, in most cases these wedging members cannot be reused after a first use.

It is therefore the essential purpose of the present invention to provide an assembling device of the type broadly set forth hereinabove, but designed with a view to avoid the inconveniences described in the foregoing.

Moreover, with this device extremely sturdy assemblies can be obtained in a wide field of applications.

To this end, the assembling device according to this invention is characterized essentially in that it comprises two wedging members consisting of a pair of complementary half-shells disposed in succession about an expansion core of substantially frustoconical or frustopyramidal configuration, said core having a tapped axial hole engaged by the control screw, said half-shells, when assembled with the core, having the same external shape as the inner sectional contour of the tubular member to be secured in position, while forming between said shells a cavity corresponding in shape to said expansion core.

Thus, by screwing the control screw in said core the latter urges the two wedging half-shells to the outside or in a direction away from the common longitudinal axis of the device, by acting against the complete inner surface of said shell cavity. On the other hand these two half-shells engage themselves with the whole of their external surface against the inner wall of the corresponding tubular member.

It is another object of the present invention to provide a specific application of this device, wherein this device is combined with at least two sets of tubular members in order to constitute multiple elements adapted to be assembled for constructing shelvings or any desired other frame structure.

According to another specific form of embodiment of this device another expansion member similar to the aforesaid expansion core or nut is provided but disposed on the opposite side and carried by a junction member adapted to receive other elements to be assembled with said tubular member secured by means of the pair of half-shells disposed on either side of said core.

However, other features and advantages of this invention will appear as the following description proceeds with reference to the accompanying drawing given by way of illustration, not of limitation, and wherein:

FIG. 1 is an exploded perspective view of the component elements of the device;

FIG. 2 is a cross-section showing a tubular member enclosing the assembling device of this invention;

FIG. 3 is a similar sectional view showing a modified form of embodiment;

FIGS. 4 and 5 are diagrammatic perspective views showing two other modified forms of embodiment of the device of this invention;

FIG. 9 is an exploded perspective view showing the main component elements of a modified form of embodiment of this device;

FIG. 10 is a vertical section taken across the device of FIG. 9, in its assembled condition;

FIG. 11 is a section taken along the line XI—XI of FIG. 10; and

FIG. 12 is an exploded perspective view showing a modified form of embodiment of the device of FIGS. 9 to 11.

Figure 6:
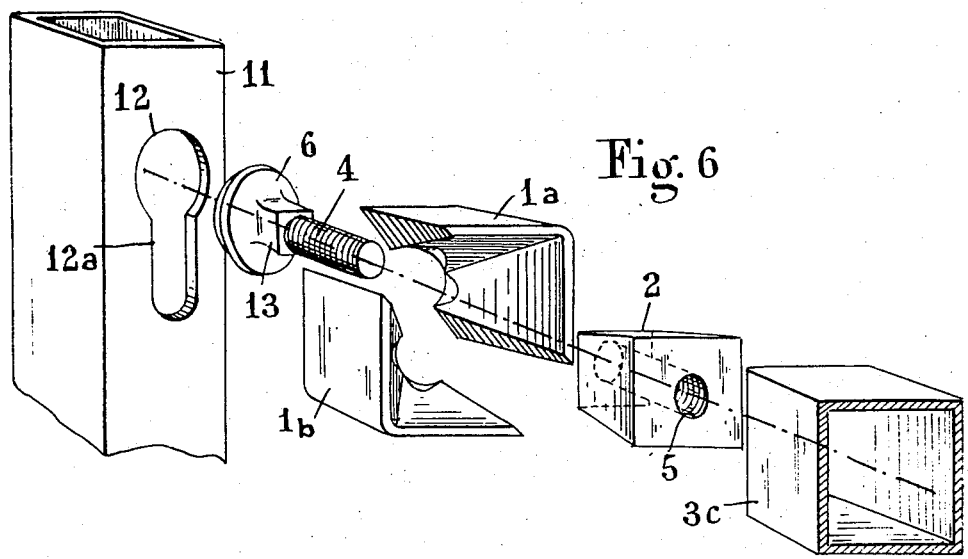
FIG. 6 is a perspective view showing still another form of embodiment, before assembling the component elements of the device.

As illustrated in FIG. 1, the assembling device according to the present invention comprises two wedging members consisting of a pair of half-shells 1a, 1b adapted to be disposed in succession on either side of a core 2 of which the longitudinal movement is adapted to urge these half-shells outwards.

In the example illustrated in FIGS. 1 and 2 the two half-shells 1a and 1b have a substantially L-shaped cross-sectional contour and comprise each two outer faces disposed at right angles. In fact, in this example the two half-shells are adapted to act as wedging members in a tubular member 3 having a square-shaped inner cross section.

These two half-shells have complementary shapes and dimensions so that when assembled on either side of core 2 they occupy a cross sectional space of same shape and substantially the same dimensions as the inner cross-sectional passage or cavity of tubular member 3.

The inner core 2 may have the shape of the frustum of a pyramid of square cross-sectional configuration, but a frustoconical shape may also be used if desired.

On the other hand, the two complementary half-shells 1a and 1b provide therebetween a cavity having the same shape as the core 2, that is, on the example of FIG. of the shape of the frustum of a pyramid having the same vertex angle as the core 2.

On the other hand, this device comprises a control screw 4 adapted to engage a tapped axial hole 5 formed in the core 2. Thus, screwing this screw 4 engaging firstly the minor base if core 2 will force the half-shells 1a and 1b outwards, since the core is thus pulled towards the screw head 6 and acts as a wedge member between the two complementary half-shells.

Of course, for utilizing this device as a means for fastening the tubular member 3 to any suitable complementary member, it is necessary that the control screw 4 extends through this complementary member or at least through a part thereof, the head 6 acting somewhat as a retaining element.

Thus, FIG. 4 illustrates by way of example the use of this assembling device for securing a tubular leg 3 to the top or tray 7 of a table. In this case the control screw 4 is inserted through a hole formed through the table top 7, the screw head 6 being housed in a recess 8 countersunk in the table top.

Thus, the longitudinal movement of core 2 due to the screwing of screw 4 causes the four inclined faces of said core to exert pressures in four different directions $F_1$, $F_2$, $F_3$, and $F_4$ (FIG. 2) against the corresponding inner faces of the two complementary half-shells 1a and 1b. The two outer faces of each half-sheel are thus pressed against the corresponding inner faces of tubular member 3.

Under these conditions, it is clear that the wedging action thus produced is perfectly balanced, inasmuch as the two wedging members are positioned at the same level instead of being somewhat offset in the axial direction as observed in various known devices pursuing the same effect.

The inner expansion core 2 could as well gave a frustoconical shape instead of the shape of the frustum of a pyramid. In this case the two complementary half-shells 1a and 1b form therebetween a recess having a likewise frustoconical configuration of same taper angle.

However, the shape of the two complementary half-shells may be modified as a function of the shape of the inner cross-sectional configuration of the tubular member to be secured in position. Thus in the modified form of embodiment illustrated in FIG. 3 the assembling device is designed for securing a tubular member 3a having a circular inner cross-sectional contour. The two half-shells 1a and 1b are replaced in this case by a pair of complementary half-shells 1c and 1d which, when assembled on either side of the corresponding core 2a, occupy a circular section having substantially the same radius as the inner section of this member, with however a slight clearance in the pre-assembled condition.

As already explained hereinabove, the assembling device according to this invention is extremely sturdy due to the very nature of the wedging members constituting same.

On the other hand, the specific arrangement and combination of elements constituting this device provide a perfectly rigid assembly, and the wedging members thereof are prevented from slipping.

Under these conditions, this device can be used in a wide field of applications, whenever it is necessary to secure a tubular member to any part, member or structure.

However, a somewhat reverse application may be contemplated for this device, for example when it is desired to secure a tubular member to an accessory to be rigidly assembled therewith.

A typical example of this assembling procedure is illustrated in FIG. 5; in this example, a tubular leg 3b has secured to its lower end a caster 9 by means of an assembling device according to this invention.

On the other hand, this assembling device may also be used for assembling a plurality of tubular members with one another. These members may be part of an assembly such as a shelving or any other similar frame structure.

Figure 7:
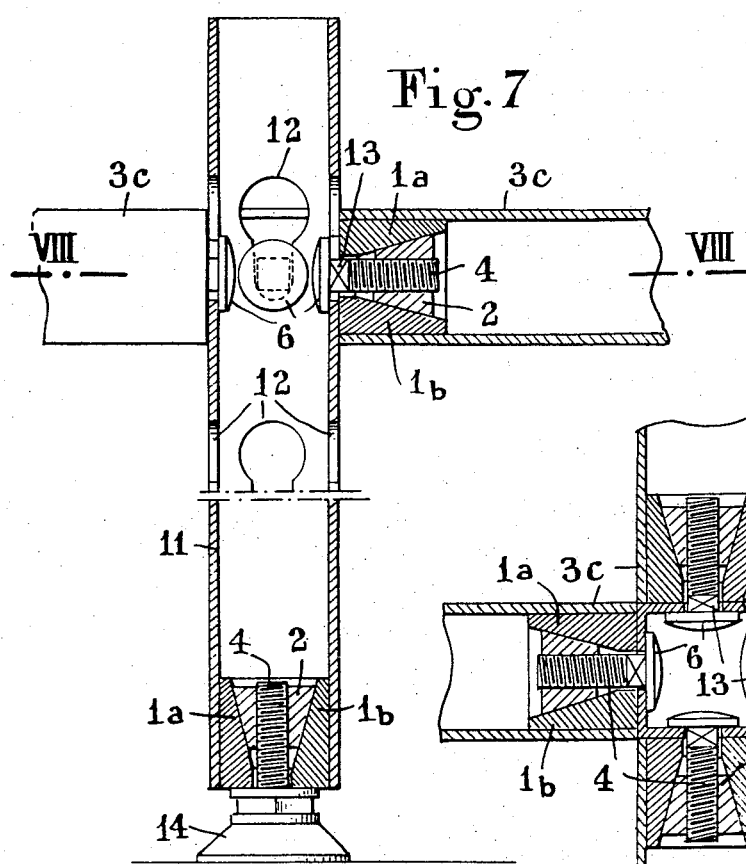
FIG. 7 is a fragmentary vertical section showing a plurality of tubular members assembled by means of assembling devices according to this invention.
Figure 8:
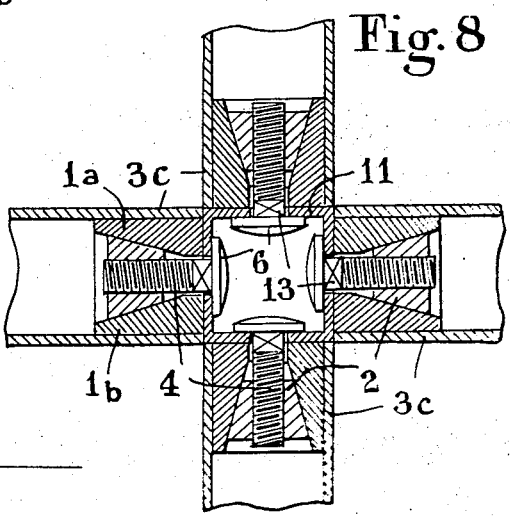
FIG. 8 is a section taken along the line VIII—VIII of FIG. 7.

Thus, FIG. 7 and 8 illustrate an exemplary form of embodiment wherein the tubular members 11 of a first series are adapted to constitute the uprights of a structure for supporting other tubular members 3c constituting another series, these members 3c being secured in horizontal positions by means of the assembling devices of this invention which are engaged to this end into the ends of said tubular members 3c. However, the tubular uprights 11 of the first series are formed with key-holes 12 adapted to receive and retain the head 6 of the control screws 4 of these assembling devices.

Moreover, the end of screw 4 which is adjacent to said head 6 comprises a square-sectioned neck portion 13 of a width corresponding substantially to that of the lower constricted portion 12a of said key-holes 12. Thus, when the head 6 of screw 4 is engaged into this lower portion 12a it is positively prevented from rotating therein. Under these conditions it is only necessary to rotate the tubular member 3c to be secured in position for tightening the screw 4 into the inner expansion core 2.

On a same tubular upright 11 it is possible to secure a plurality of other tubular members 3c disposed horizontally at the same level but in different directions. However, it is also possible, of course, to provide horizontal tubular members 3c disposed at different levels.

With this arrangement it is thus possible without difficulty to construct shelvings or frame structures for any desired purpose. A bearing shoe 14 may be secured in the same fashion to the lower end of each vertical upright 11.

FIGS. 9 and 10 illustrate a specific form of embodiment of the assembling device of this invention wherein the above-described device is combined with an assembling head 15 designed for interconnecting a pair of section members 16a and 16b to be assembled with a tubular member 3d disposed at right angles to the plane containing these two sections.

Thus, the device illustrated may be used for assembling two adjacent sides 16a and 16b of the frame encircling the tray or top of a table with a leg 3d thereof.

The assembling head 15 has substantially the appearance of a hollow cage open at its top and having a substantially square-shaped horizontal section.

Two vertical faces of this head 15 comprise windows 17a, 17b adapted to receive end pieces 18a, 18b fitted to the tubular members 16a and 16b.

In combination with this junction head 15 a pair of half-shells 19 are provided and adapted to engage the corresponding end of section member 3d. These half-shells correspond somewhat to those provided in the forms of embodiment illustrated in FIGS. 1 to 8. However, they differ therefrom in that they are adapted to be disposed between two expansion members 20 and 2d of frustoconical or frustopyramidal configuration.

The first expansion member 20 consists of a projection depending from the lower face of the junction head 3. The other expansion member 2d consists of a nut adapted to be engaged by the traction screw 4d having its head 6d disposed within said junction head 15.

These two expansion members engage corresponding hollow seats 21 formed by properly shaping the relevant ends of said pair of half-shells 19. Of course, these seats have the same configuration as the expansion members 20 and 2d.

Thus, by screwing the traction screw 4d into the nut 2d the faces of these two expansion members are caused to slide on the registering faces of the seats formed on the end portions of the pair of half-shells 19, and therefore these shells are caused to expand within the section member 3d. Under these conditions, the two half-shells 19 are wedged and locked in this member so as to firmly secure the member 3d to the junction head 15.

The other two section members 16a and 16b are secured by means of the end pieces 18a and 18b.

Each end piece 18a 18b comprises two well-defined sections adapted to engage the inner cavity of junction head 15 and the corresponding end of the relevant section member 16a or 16b, respectively.

This last-mentioned section is secured in position by means of a pair of hook members 22 consisting of a pair of resilient steel blades engaging a pair of transverse grooves 23 provided to this end in the corresponding portion of each end piece. These two blades are longer than the corresponding grooves so that their ends project therefrom.

Now these ends are slightly curved in the proper direction to constitute anchoring hooks permitting the engagement of the corresponding portion of the end piece into the section 16a or 16b while preventing any subsequent release of these two members.

The other portion of each end piece 18a, 18b adapted to engage the cavity of junction head 15 terminates with a bevel cut. These two end pieces are locked within the head 15 by means of a key or like member 23 sunk vertically into this head.

This key 23 has a substantially L-shaped cross-sectional contour so as to engage the two adjacent faces of the inner wall of the junction head 15 which are opposed to the two faces already engaged by the corresponding ends of said end-pieces 18a and 18b.

The inner edges of the wings of this key then engage a shoulder 24 formed on the registering surfaces of the corresponding ends of the pair of end pieces 18a and 18b (see FIG. 11).

However, the cross-sectional dimension of key 23 decreases gradually from its lower end to its upper end, as clearly shown in FIG. 9. Therefore, this key must be force-fitted, for example by using a hammer. Thus, a definitely rigid and reliable fastening of the two end pieces in the junction head 15 is obtained, which means a perfect assembling of the two section members 16a and 16b on said head already provided with section member 3d.

As already explained in the foregoing, the assembling device of this invention permits of interconnecting three section members directed like the edges of a trihedron. Therefore, this device can be used for assembling one of the vertical legs of a table with the two adjacent sides of the frame of the table top. However, this assembling device may be designed with a view to assemble a greater number of elements.

Thus, the modified form of embodiment illustrated in FIG. 12 is also intended for securing a section member 3e constituting somewhat the extension of section member 3d, this device assembling on the other hand two other section members 16a and 16b as in the preceding form of embodiment.

To this end the device according to this invention comprises a junction head 15 identical with the preceding one, together with two fastening end-pieces 18a and 18b. However, this device further comprises a cap 25 adapted to fit on the upper end of the junction head 15.

The upper surface of this cap carries a projection 20e similar to the projection 20 provided on the lower face of the junction head. Besides, this projection 20e is also adapted to constitute an expansion member in conjunction with another nut-forming expansion member 2e adapted to receive a traction screw. These two expansion members are disposed on either side of a pair of half-shells 19e identical with the two half-shells 19 but adapted to be engaged into the lower end of section member 3e.

Under these conditions the present device can constitute a vertical upright consisting of two section members 3d and 3e, and having secured thereto, at an intermediate point thereof, a pair of members 16a and 16b possibly connected to other vertical uprights by means of other junction heads 15.

It is thus clear that with the device of this invention it is possible to construct a frame structure consisting of a series of section members extending in various directions, for example for erecting shelvings and the like.

However, the junction head 15 comprising two windows 17a, 17b may be replaced with other junction heads having a greater number of similar windows so that a plurality of section members all lying in a common plane can be assembled to constitute a single structure.

According to the number of end pieces engaged into a same junction head, a suitable number of keys 23 may be used for locking them in position.

Of course, the junction heads 15 may have cross-sectional contours other than those contemplated in the above-described examples; thus, these junction heads may also have a polygonal cross-sectional contour in lieu of the square contour illustrated. Besides, any other contours, even irregular ones, may be used to this end.

Although various forms of embodiment of this invention have been described and illustrated herein, it will readily occur to those conversant with the art that many modifications and changes may be brought thereto without departing from the scope of the invention as set forth in the appended claims.

What I claim is:

1. An assembling device for securing a tubular member to any other member, comprising a pair of wedging members adapted to be engaged into said tubular member and having externally the same shape as the inner section of said tubular member, said wedging members consisting of a pair of complementary half-shells forming between them a cavity of which the internal wall is inclined, a first expansion core disposed into said cavity and of which the external wall has the same inclination as the internal wall of said cavity, an axial hole formed into said core, a control screw engaged in said hole and adapted to cause an axial movement of said first expansion core in said cavity for obtaining the expansion of said complementary half-shells, a second expansion core os similar configuration to said first expansion core, but disposed opposite therefrom and carried by a junction member adapted to interconnect a number of other section members, said complementary half-shells comprising at each end a cavity adapted to receive respectively said first expansion core and said second expansion core and said control screw operatively engaging said second expansion core for causing relative movement of said first and second expansion cores and obtaining expansion of said wedging members, said junction member has substantially the shape of a cage of which the vertical faces comprise apertures corresponding in number to the section members to be secured with it, and said device further comprises an end piece fitted to the end of each section member and which is adapted to be engaged into an aperture of said junction member, at least one sliding key being provided for locking said end pieces into said junction member.

2. An assembling device according to claim 1, in which said end pieces are engagable into the corresponding end of said sections members, and said end pieces are provided with resilient blades having slightly curved projecting ends for releasably connecting each end piece in the corresponding section member.

3. An assembling device according to claim 1, in which said junction member comprises an opening on its side opposite to that carrying said second expansion core provided on said said junction member, said opening being adapted to receive the sliding key adapted to lock the end pieces into said junction member.

4. An assembling device according to claim 3, further comprising an insert adapted to be engaged into the opening provided in said junction member, said insert constituting a third expansion core similar to that carried by said junction member, and said third expansion core being connected through a screw to a fourth expansion core positioned beyond a pair of additional complementary wedging half-shells adapted to be engaged into a second tubular member to be secured operatively on said junction member.

* * * * *